US009665620B2

(12) United States Patent
Schechter et al.

(10) Patent No.: US 9,665,620 B2
(45) Date of Patent: *May 30, 2017

(54) MANAGING DATA QUERIES

(75) Inventors: Ian Schechter, Sharon, MA (US);
Glenn John Allin, Arlington, MA (US);
J. Skeffington Wholey, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 330 days.

This patent is subject to a terminal disclaimer.

(21) Appl. No.: 12/688,316

(22) Filed: Jan. 15, 2010

(65) Prior Publication Data

US 2011/0179014 A1   Jul. 21, 2011

(51) Int. Cl.
*G06F 17/30* (2006.01)

(52) U.S. Cl.
CPC .. *G06F 17/30463* (2013.01); *G06F 17/30395* (2013.01); *G06F 17/30412* (2013.01)

(58) Field of Classification Search
None
See application file for complete search history.

(56) References Cited

U.S. PATENT DOCUMENTS

| 5,088,034 | A | 2/1992 | Ihara et al. |
| 5,151,991 | A | 9/1992 | Iwasawa et al. |
| 5,313,584 | A | 5/1994 | Tickner et al. |
| 5,347,639 | A | 9/1994 | Rechtschaffen et al. |
| 5,367,619 | A | 11/1994 | Dipaolo et al. |
| 5,446,915 | A | 8/1995 | Pierce |
| 5,475,842 | A | 12/1995 | Gilbert et al. |

(Continued)

FOREIGN PATENT DOCUMENTS

| CA | 2259362 | 1/1998 |
| CN | 1786950 | 6/2006 |

(Continued)

OTHER PUBLICATIONS

Flat file database http://en.wikipedia.org/w/index.php?title=Flat_file_database&oldid=336589178 as of Jan. 8, 2010.*

(Continued)

*Primary Examiner* — Bai D. Vu
(74) *Attorney, Agent, or Firm* — Fish & Richardson P.C.

(57) ABSTRACT

One method includes receiving a database query, receiving information about a database table in data storage populated with data elements, producing a structural representation of the database table that includes a formatted data organization reflective of the database table and is absent the data elements of the database table, and providing the structural representation and the database query to a plan generator capable of producing a query plan representing operations for executing the database query on the database table. Another method includes receiving a query plan from a plan generator, the plan representing operations for executing a database query on a database table, and producing a dataflow graph from the query plan, wherein the dataflow graph includes at least one node that represents at least one operation represented by the query plan, and includes at least one link that represents at least one dataflow associated with the query plan.

41 Claims, 8 Drawing Sheets

(56) References Cited

U.S. PATENT DOCUMENTS

| | | | |
|---|---|---|---|
| 5,475,843 A | 12/1995 | Halviatti et al. | |
| 5,546,576 A * | 8/1996 | Cochrane et al. | 707/999.002 |
| 5,574,898 A | 11/1996 | Leblang et al. | |
| 5,588,150 A | 12/1996 | Lin et al. | |
| 5,600,833 A | 2/1997 | Senn et al. | |
| 5,619,692 A | 4/1997 | Malkemus et al. | |
| 5,632,022 A | 5/1997 | Warren et al. | |
| 5,678,044 A | 10/1997 | Pastilha et al. | |
| 5,682,537 A | 10/1997 | Davies et al. | |
| 5,706,509 A | 1/1998 | Man-Hak Tso | |
| 5,712,971 A | 1/1998 | Stanfill et al. | |
| 5,734,886 A | 3/1998 | Grosse et al. | |
| 5,752,196 A | 5/1998 | Ahvenainen et al. | |
| 5,768,564 A | 6/1998 | Andrews et al. | |
| 5,799,149 A | 8/1998 | Brenner et al. | |
| 5,819,021 A | 10/1998 | Stanfill et al. | |
| 5,870,743 A | 2/1999 | Cohen et al. | |
| 5,901,353 A | 5/1999 | Pentikainen | |
| 5,909,681 A | 6/1999 | Passera et al. | |
| 5,930,723 A | 7/1999 | Heiskari et al. | |
| 5,935,216 A | 8/1999 | Benner et al. | |
| 5,956,074 A | 9/1999 | Gautam et al. | |
| 5,966,072 A | 10/1999 | Stanfill et al. | |
| 5,999,729 A | 12/1999 | Tabloski, Jr. et al. | |
| 6,031,993 A | 2/2000 | Andrews et al. | |
| 6,077,313 A | 6/2000 | Ruf | |
| 6,205,465 B1 | 3/2001 | Schoeing et al. | |
| 6,253,371 B1 | 6/2001 | Iwasawa et al. | |
| 6,266,804 B1 | 7/2001 | Isman | |
| 6,295,518 B1 | 9/2001 | McLain et al. | |
| 6,311,265 B1 | 10/2001 | Beckerle et al. | |
| 6,330,008 B1 | 12/2001 | Razdow et al. | |
| 6,345,267 B1 * | 2/2002 | Lohman et al. | 707/999.002 |
| 6,415,286 B1 | 7/2002 | Passera et al. | |
| 6,453,464 B1 | 9/2002 | Sullivan | |
| 6,615,203 B1 | 9/2003 | Lin et al. | |
| 6,625,593 B1 * | 9/2003 | Leung et al. | 707/999.002 |
| 6,694,306 B1 | 2/2004 | Nishizawa et al. | |
| 6,785,668 B1 | 8/2004 | Polo et al. | |
| 6,915,290 B2 * | 7/2005 | Bestgen et al. | 707/999.002 |
| 7,047,232 B1 | 5/2006 | Serrano | |
| 7,080,062 B1 * | 7/2006 | Leung et al. | 707/999.002 |
| 7,111,019 B1 * | 9/2006 | Nishizawa | G06F 17/30433 |
| 7,133,861 B2 * | 11/2006 | Day et al. | 707/999.002 |
| 7,164,422 B1 | 1/2007 | Wholey, III et al. | |
| 7,167,850 B2 | 1/2007 | Stanfill | |
| 7,249,120 B2 * | 7/2007 | Bruno et al. | 707/999.002 |
| 7,359,922 B2 * | 4/2008 | Young-Lai et al. | 707/999.2 |
| 7,464,084 B2 | 12/2008 | Huang et al. | |
| 7,584,205 B2 * | 9/2009 | Stanfill et al. | |
| 7,664,730 B2 * | 2/2010 | Ziauddin et al. | 707/718 |
| 7,856,462 B2 | 12/2010 | Huang et al. | |
| 7,945,562 B2 | 5/2011 | Ahmed et al. | |
| 7,953,891 B2 * | 5/2011 | Blaszczak et al. | 709/246 |
| 8,122,088 B2 | 2/2012 | Banatwala | |
| 8,412,746 B2 | 4/2013 | Fox et al. | |
| 8,538,985 B2 | 9/2013 | Betawadkar-Norwood et al. | |
| 8,875,145 B2 | 10/2014 | Atterbury et al. | |
| 2003/0120682 A1 | 6/2003 | Bestgen et al. | |
| 2005/0108209 A1 * | 5/2005 | Beyer et al. | 707/3 |
| 2005/0278152 A1 * | 12/2005 | Blaszczak | 703/1 |
| 2006/0095466 A1 | 5/2006 | Stevens et al. | |
| 2006/0265362 A1 | 11/2006 | Bradford | |
| 2006/0294150 A1 | 12/2006 | Stanfill et al. | |
| 2007/0067274 A1 | 3/2007 | Han et al. | |
| 2007/0186036 A1 | 8/2007 | Bittner | |
| 2007/0271381 A1 | 11/2007 | Wholey et al. | |
| 2008/0049022 A1 | 2/2008 | Sherb et al. | |
| 2008/0052299 A1 | 2/2008 | Shinke et al. | |
| 2008/0151749 A1 | 6/2008 | Kawamura | |
| 2008/0256014 A1 | 10/2008 | Gould et al. | |
| 2008/0270646 A1 | 10/2008 | Wong | |
| 2009/0083313 A1 | 3/2009 | Stanfill et al. | |
| 2009/0125887 A1 | 5/2009 | Kahlon et al. | |
| 2009/0222404 A1 * | 9/2009 | Dolin et al. | 707/2 |
| 2009/0225082 A1 * | 9/2009 | Hargrove et al. | 345/440 |
| 2009/0254774 A1 | 10/2009 | Chamdani et al. | |
| 2010/0005077 A1 * | 1/2010 | Krishnamurthy et al. | 707/999.004 |
| 2010/0057695 A1 * | 3/2010 | Kirovski | G06F 17/30867 707/E17.108 |
| 2010/0211953 A1 | 8/2010 | Wakeling et al. | |
| 2011/0010358 A1 * | 1/2011 | Zane | G06F 17/30421 707/714 |
| 2011/0029571 A1 * | 2/2011 | Aggarwal et al. | 707/798 |
| 2011/0072319 A1 | 3/2011 | Agarwal et al. | |
| 2011/0246448 A1 | 10/2011 | Tatemura et al. | |
| 2011/0276789 A1 | 11/2011 | Chambers et al. | |
| 2012/0246158 A1 | 9/2012 | Ke et al. | |
| 2014/0019949 A1 | 1/2014 | Craymer | |
| 2014/0032617 A1 | 1/2014 | Stanfill | |
| 2014/0280037 A1 | 9/2014 | Petride et al. | |

FOREIGN PATENT DOCUMENTS

| | | |
|---|---|---|
| CN | 1790324 | 6/2006 |
| EP | 0421408 | 4/1991 |
| EP | 2110761 | 10/2009 |
| EP | 2251785 | 11/2010 |
| FI | 944887 | 7/1997 |
| FI | 945495 | 9/1997 |
| FI | 951270 | 10/1997 |
| JP | 3-126169 | 5/1991 |
| JP | 8-16429 | 1/1996 |
| JP | 10-232875 | 9/1998 |
| JP | 10-340276 | 12/1998 |
| JP | 11-514116 | 11/1999 |
| JP | 2000148699 | 5/2000 |
| JP | 2003-505766 | 2/2003 |
| JP | 2003-099441 | 4/2003 |
| JP | 2006-236360 | 9/2006 |
| WO | WO 97/23826 | 7/1997 |

OTHER PUBLICATIONS

Torrent Technical White Paper, "Orchestrator for the SAS System—Delivering Scalability and Performance to SAS Applications," pp. 1-30.

Forrester Research's Ellen Carney Names Compact Solutions Among "Hot Insurance Tech Companies—2009", Jun. 29, 2009.

"Relational algebra", http/en.wikipedia.org/wiki/Relational_algebra, Feb. 5, 2010.

Levy et al., "Querying Heterogeneous Information Sources Using Source Descriptions", Proceedings of the 22$^{nd}$ VLDB Conference, Mumbai (Bombay), India, pp. 251-262, 1996.

Graefe, "Encapsulation of Parallelism in the Volcano Query Processing System", ACM, pp. 102-111, 1990.

DeWitt et al., "Parallel Database Systems: The Future of High Performance Database Systems", Communications of the ACM, vol. 35, No. 6, pp. 85-98, Jun. 1992.

Mackert et al., "R* Optimizer Validation and Performance Evaluation for Distributed Queries", Proceedings of the Twelfth International Conference on Very Large Data Bases, Kyoto, pp. 149-159, Aug. 1986.

Chamberlin et al., "A History of Evaluation of System R", Communications of the ACM, vol. 24, No. 10, pp. 632-646, Oct. 1981.

Aho et al., "Universality of Data Retrieval Languages", ACM, pp. 110-120. 1979.

Selinger et al., "Access Path Selection in a Relational Database Management System", ACM, pp. 23-34, 1979.

Afrati et al., "Performance Considerations on a Random Graph Model for Parellel Processing", Informatique Theorique et Applications, vol. 27, No. 4, pp. 367-388, (1993).

Apers et al., "PRISMA/DB: A Parallel, Main Memory Relational DBMS", IEEE, pp. 541-554 (1992).

Bodin, Francois et al., "A User Level Program Transformation Tool," ACM 1998, pp. 180-187.

Boral et al., "Prototyping Bubba: A Highly Parallel Database System", IEEE, vol. 2, No. 1 pp. 4-24, (Mar. 1990).

(56) References Cited

OTHER PUBLICATIONS

Braun, Peter, "Parallel Program Debugging Using Scalable Visualization",IEEE, pp. 699-708 (1995).
Canadian Office Action issued in application No. 2,2360,286, dated Jul. 27, 2005, 3 pages.
DeWitt et al., "The Gamma Database Machine Project", IEEE, vol. 2, No. 1, pp. 44-62, (Mar. 1990).
Graefe et al., "Encapsulation of Parallelism and Architecture Independence in Extensible Database Query Execution", IEEE, vol. 19, No. 8, pp. 749-764 (Aug. 1993).
Graefe, Goetze "Volcano—An Extensible and Parellel Query Evaluation System", IEEE, vol. 6, No. 1, pp. 120-135 (Feb. 1994).
International Search Report & Written Opinion, Patent Cooperation Treaty, issued in PCT application No. PCT/US2000/00934, mailed Jan. 4, 2011, 5 pages.
Li et al., "Load Balancing Problems for Multiclass Jobs in Distributed/Parellel Computer Systems", IEEE, vol. 47, No. 3, pp. 322-332, (Mar. 1998).
Notice of Reasons for Rejection issued in Japanese Application No. 2000-594025, mailed Mar. 29, 2005, 3 pages.
Rim et al., "An Efficient Dynamic Load Balancing Using the Dimension Exchange Method for Balancing Quantized Loads on Hypercube Multiprocessors", IEEE, pp. 708-712 (1999).
Stanfill, Craig, "Massively Parallel Information Retrieval for Wide Area Information Servers", IEEE, pp. 679-682 (1991).
Stanfill, Craig, "The Marriage of Parallel Computing and Information Retrieval", IEEE, (2003).
International Search Report & Written Opinion, Patent Cooperation Treaty, issued in PCT application No. PCT/US2011/021260, mailed Apr. 18, 2011, 12 pages.
Josifovski, Vanja, et al., "Optimizing Queries in Distributed and Composable Mediators." Cooperative Information Systems, 1999. COOPIS '99 Proceedinngs, 1999 I FCIS International Conference in Ediburgh, UK Sep. 2-4, 1999. Sep. 2, 1999, pp. 291-302.
Adamos, Panayiotis, et al., "Architectural Principles of the 'Streamonas' Data Stream Management System and Performance Evaluation based on the Linear Road Benchmark." 2008 International Conference on Computer Science and Software Engineering, Dec. 12, 2008, pp. 643-646.
Seshadri, Sangeetha, et al., "Optimizing Multiple Queries in Distributed Data Stream Systems." Proceedings of the $22^{nd}$ International Conference on Data Engineering Workshops (ICDEW '06), Apr. 3, 2006, 6 pages.
International Search Report & Written Opinion, PCT/US2012/035762, mailed Feb. 19, 2013, 14 pages.
Tjan, Bosco S., et al., "A Data-Flow Graphical User Interface for Querying a Scientific Database," 12602 Proceedings 1993 Symposium on Visual Languages, Aug. 24-27, 1993, 6 pages.
Japanese Office Action, with English translation, JP Application No. 2012-549105, mailed Apr. 22, 2014, 9 pages.
International Preliminary Report on Patentability, PCT/US2011/021260, mailed May 24, 2012 (28 pages).
Chinese Office Action (with English Translation) issued in application No. 201180014176.7, on Jan. 7, 2015, 24 pages.
Cimitile et al., "Incremental migration strategies: Data flow analysis for wrapping," IEEE Comput. Soc. US., pp. 59-68 Oct. 12, 1998, XP10309754.
Japanese Office Action, with English translation, JP 2012-549105, mailed Mar. 25, 2015.
Josifovski, Vanja, et al., "Optimizing Queries in Distributed and Composable Mediators." Cooperative Information Systems, 1999. COOPIS '99 Proceedings, 1999 I FCIS International Conference in Ediburgh, UK Sep. 2-4, 1999. Sep. 2, 1999, pp. 291-302.
Garcia-Molina et al., "Database Systems The Complete Book Second Edition—Chapter 16—The Query Compiler," Pearson Prentice Hall, XP055315926, Jun. 15, 2008.
Ozsu et al., "Principles of Distributed Database Systems—Chapter 9—Multidatabase Query Processing", Principles of Distributed Database Systems: Third Edition, Springer New York, NY XP055267246, Mar. 2, 2011.
U.S. Appl. No. 14/628,643, filed Feb. 23, 2015, Managing Data Queries.
U.S. Appl. No. 14/746,188, filed Jun. 22, 2015, Processing Queries Containing a Union-Type Operation.
U.S. Appl. No. 14/563,066, filed Dec. 8, 2014, Source Code Translation.
U.S. Appl. No. 14/752,094, filed Jun. 26, 2015, Querying a Data Source on a Network.
Transaction History, U.S. Appl. No. 13/098,823, Jul. 11, 2013, 2 pages.
Transaction History, U.S. Appl. No. 09/229,849, Jul. 11, 2013, 3 pages.

* cited by examiner

MANAGING DATA QUERIES

BACKGROUND

This description relates to managing data queries.

Data can be stored in databases and arranged in various forms such as database tables. A database table can contain a set of data having a common theme or purpose. The arrangement of a database table can be defined by a database scheme, and multiple database tables can have similar or identical arrangements. Further, the contents of a database and its associated database tables can change over time as data is adjusted, appended or deleted. Various techniques can be used to transfer data into and out of a database and to manipulate the data in the database.

SUMMARY

In one aspect, in general, a method of preparing a database query for use by a data management system includes receiving a database query, receiving information about a database table from a data storage, the database table being populated with data elements, producing a structural representation of the database table wherein the structural representation includes a formatted data organization reflective of the database table and is absent the data elements of the database table, and providing the structural representation and the database query to a plan generator capable of producing a query plan representing operations for executing the database query on the database table.

Aspects can include one or more of the following features.

The database query includes an SQL query.

Producing the structural representation of the database table includes determining data types from data structures in the database table, and assigning the data types to corresponding data structures in the structural representation.

Producing the structural representation of the database table includes determining data storage sizes of the data elements in the database table, and assigning the calculated data storage sizes to the structural representation.

Receiving the information about the database table includes identifying the database table based on a data source registry.

The data source registry contains data formats, keys, and indices of data sources.

In one aspect, in general, a method of generating a dataflow graph representing a database query includes receiving a query plan from a plan generator, the query plan representing operations for executing a database query on a database table, and producing a dataflow graph from the query plan, wherein the dataflow graph includes at least one node that represents at least one operation represented by the query plan, and includes at least one link that represents at least one dataflow associated with the query plan.

Aspects can include one or more of the following features.

The database query includes an SQL query.

Thee dataflow graph includes at least one node receiving a flow of data from at least one input dataset, and at least one node providing a flow of data to at least one output dataset.

The method further includes providing the database table to the dataflow graph, and executing the dataflow graph.

The method further includes receiving the output of the database query from the dataflow graph.

The plan generator includes a query optimizer.

Generating a specification of a dataflow graph includes mapping query operations of the query plan to components of the dataflow graph.

The query plan includes data types of parameters in the database query.

The database query contains a reference to an executable function, and the specification of a dataflow graph includes a component representing the executable function.

In one aspect, in general, a method of generating a dataflow graph representing a database query includes receiving an SQL query, receiving information about a database table from a data storage, the database table being populated with data elements, producing a structural representation of the database table wherein the structural representation includes a formatted data organization reflective of the database table and is absent the data of the database table, providing the structural representation and the SQL query to a plan generator capable of producing a query plan representing operations for executing the SQL query on the database table, receiving a query plan from the plan generator, and producing a dataflow graph from the query plan, wherein the dataflow graph includes at least one node that represents at least one operation represented by the query plan, and includes at least one link that represents at least one dataflow associated with the query plan.

In one aspect, in general, a system for preparing a database query for use by a data management system includes a data storage containing information about a database table, the database table being populated with data elements, and a computer system configured to receive a database query, produce a structural representation of the database table wherein the structural representation includes a formatted data organization reflective of the database table and is absent the data elements of the database table, and provide the structural representation and a database query to a plan generator capable of producing a query plan representing operations for executing the database query on the database table.

In one aspect, in general, a system for generating a dataflow graph representing a database query includes a computer system configured to receive a query plan from a plan generator, the query plan representing operations for executing a database query on a database table, and produce a dataflow graph from the query plan, wherein the dataflow graph includes at least one node that represents at least one operation represented by the query plan, and includes at least one link that represents at least one dataflow associated with the query plan.

In one aspect, in general, a system for preparing a database query for use by a data management system includes means for storing information about a database table, the database table being populated with data elements, and means for processing database queries, the processing including receiving a database query, producing a structural representation of the database table wherein the structural representation includes a formatted data organization reflective of the database table and is absent the data elements of the database table, and providing the structural representation and the database query to a plan generator capable of producing a query plan representing operations for executing the database query on the database table.

In one aspect, in general, a system for generating a dataflow graph representing a database query includes means for processing a query plan, the processing including receiving a query plan from a plan generator, the query plan representing operations for executing a database query on a database table, and producing a dataflow graph from the query plan, wherein the dataflow graph includes at least one node that represents at least one operation represented by the query plan, and includes at least one link that represents at least one dataflow associated with the query plan.

In one aspect, in general, a computer-readable medium storing a computer program for preparing a database query for use by a data management system includes instructions for causing a computer to receive a database query, receive information about a database table from a data storage, the database table being populated with data elements, produce a structural representation of the database table wherein the structural representation includes a formatted data organization reflective of the database table and is absent the data elements of the database table, and provide the structural representation and the database query to a plan generator capable of producing a query plan representing operations for executing the database query on the database table.

In one aspect, in general, a computer-readable medium storing a computer program for generating a dataflow graph representing a database query includes instructions for causing a computer to receive a query plan from a plan generator, the query plan representing operations for executing a database query on a database table, and produce a dataflow graph from the query plan, wherein the dataflow graph includes at least one node that represents at least one operation represented by the query plan, and includes at least one link that represents at least one dataflow associated with the query plan.

DESCRIPTION

1 Databases, Queries, and Graphs

A database management system handles data stored in one or more databases. To store such data, database storage can take one or more forms such as database tables, which can be collections of data organized into data structures such as rows and columns. In one construct, each row represents a record of data, and each column represents a field within each of the rows.

The information contained in a database can be accessed and processed (e.g., modified) using database queries. A database query is a set of instructions describing a subset of the database contents and actions to take upon the data in that subset. For example, some database systems perform database queries written in a dedicated database query language such as Structured Query Language (SQL). In theses database systems, an SQL query is the primary instrument for manipulating the contents of the database.

In some implementations, database queries and other computations associated with a database management system in a graphical representation. For example, data may be represented as passing through a collection of operations, referred to as a dataflow. In one arrangement, a dataflow may be provided through a directed graph, with components of the computation being associated with the vertices of the graph and dataflows between the components corresponding to links (arcs, edges) of the graph. A graph is a modular entity and may be connected to or combined with other modular graphs. Each graph can be made up of one or more other graphs, and a particular graph can be a component in a larger graph. A graphical development environment (GDE) provides a user interface for specifying executable graphs and defining parameters for the graph components. A system that implements such graph-based computations is described in U.S. Pat. No. 5,966,072, EXECUTING COMPUTATIONS EXPRESSED AS GRAPHS, which is incorporated herein by reference in its entirety.

Figure 1:
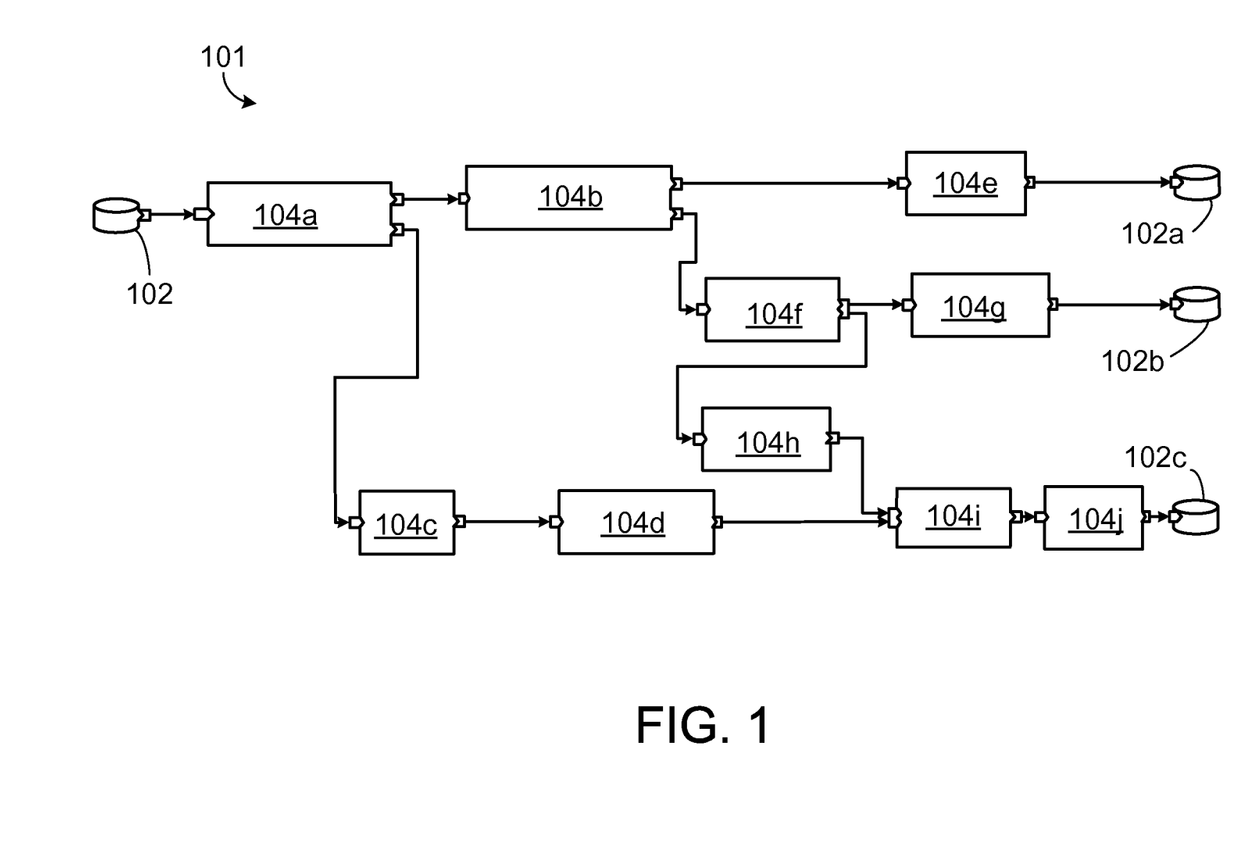
FIG. 1 is a block diagram of a dataflow graph.

Referring to FIG. 1, an example of a dataflow graph 101 includes an input component 102 providing a collection of data to be processed by the executable components 104a-104j of the dataflow graph 101. In some example, the input component 102 is a data source that can comprise data records associated with a database system or transactions associated with a transaction processing system. The data records may be stored in various forms such as a database table, for example. Each executable component 104a-104j is associated with a portion of the computation defined by the overall dataflow graph 101. Work elements (e.g., individual data records from the data collection or database table) enter one or more input ports of a component, and output work elements (which are in some cases the input work elements, or processed versions of the input work elements) typically leave one or more output ports of the component. In dataflow graph 101, output work elements from components 104e, 104g, and 104j are stored in output data components 102a-102c.

Some graph-based database systems are used to process database queries. For example, a database query can be applied to one or more database tables to extract an identified subset of the database table contents, for example, for processing in a dataflow. In some implementations, a graph-based database system accepts and executes database queries in the form of dataflow graphs. Other database systems may use other types of database queries.

In some cases, one or more database tables are moved to a graph-based database system from another kind of database system that uses SQL. The other database system may have many SQL queries already written that are incompatible with the graph-based database system. In some implementations, the SQL queries can be converted to database queries compatible with the graph-based database system.

Figure 2:
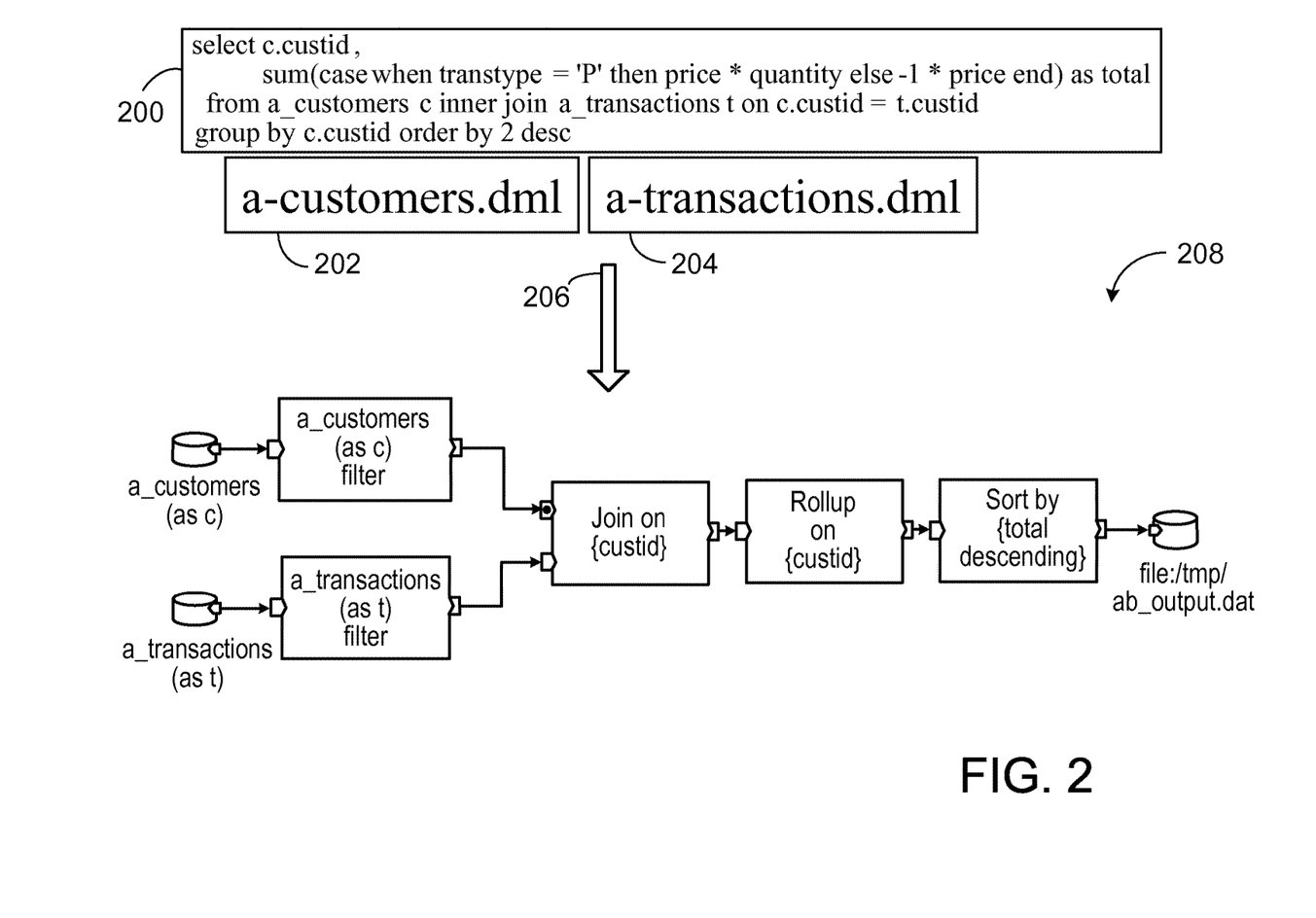
FIG. 2 illustrates a database query and a dataflow graph.

FIG. 2 shows an example of a database query 200 written in SQL. This example database query 200 is intended to operate on database tables 202, 204 managed by a graph-based database management system. The graph-based database management system can recognize the data in the database tables 202, 204 because the database tables are in a format native to the graph-based database management system. The database tables 202, 204 might contain data obtained from other database tables, for example, database tables originating from a database system that recognizes SQL queries and does not use dataflow graphs.

However, the graph-based database management system does not have built-in functionality for processing SQL queries, so a graph-based database query can be produced to emulate the SQL database query 200. The graph-based database query is recognizable by the graph-based database system. For example, the database query 200 can be converted 206 from an SQL query into a dataflow graph 208. The dataflow graph 208 operates on the database tables 202, 204 by accepting them as input, and provides the execution results of the database query 200 as output.

2 Query Plans

Some database systems carry out database queries such as SQL queries based on a query plan (also sometimes called an explain plan). A query plan is a description of the database operations that may be performed if the database query is executed. The query plan may describe one possible arrangement of database operations, even if other arrangements of the operations or a different set of operations would accomplish the same result.

To provide such query plans, a database system may include a query plan generator (also sometimes called a query planner). For example, the query plan generator can produce a query plan when a database query is being executed, or the query plan generator can generate a query plan before any decision about executing the query is made.

In some arrangements, database operations may be executed in various orders while still providing equivalent outputs. As such, the query plan generator may have functionality that determines an optimal query plan. For example, an optimal query plan could be the query plan that describes the arrangement of database operations for executing the database query in the least amount of time, or using the least amount of database resources such as data storage space, or otherwise accomplishing the database query within constraints that have been identified by the database system. The query plan generator's functionality for determining an optimal query plan may include functionality that scores or ranks many possible query plans, and may also include functionality that rearranges possible query plans to an optimal or efficient configuration.

A single database query can be executed multiple times, and each execution could have a unique optimal query plan. For example, the data within a database table could change between two executions of a database query. In this example, the operations described in the query plan that was generated for the first execution of the database query may need more or less execution time during the second execution of the database query than during the first execution. In this case, a different arrangement of operations may be better suited to the second execution of the database query, for example, a different arrangement of the same operations, or an arrangement of different operations. A query plan optimized for the second execution of the database query can be generated for that execution, taking into account the momentary state of the database table.

3 System Overview

Figure 3:
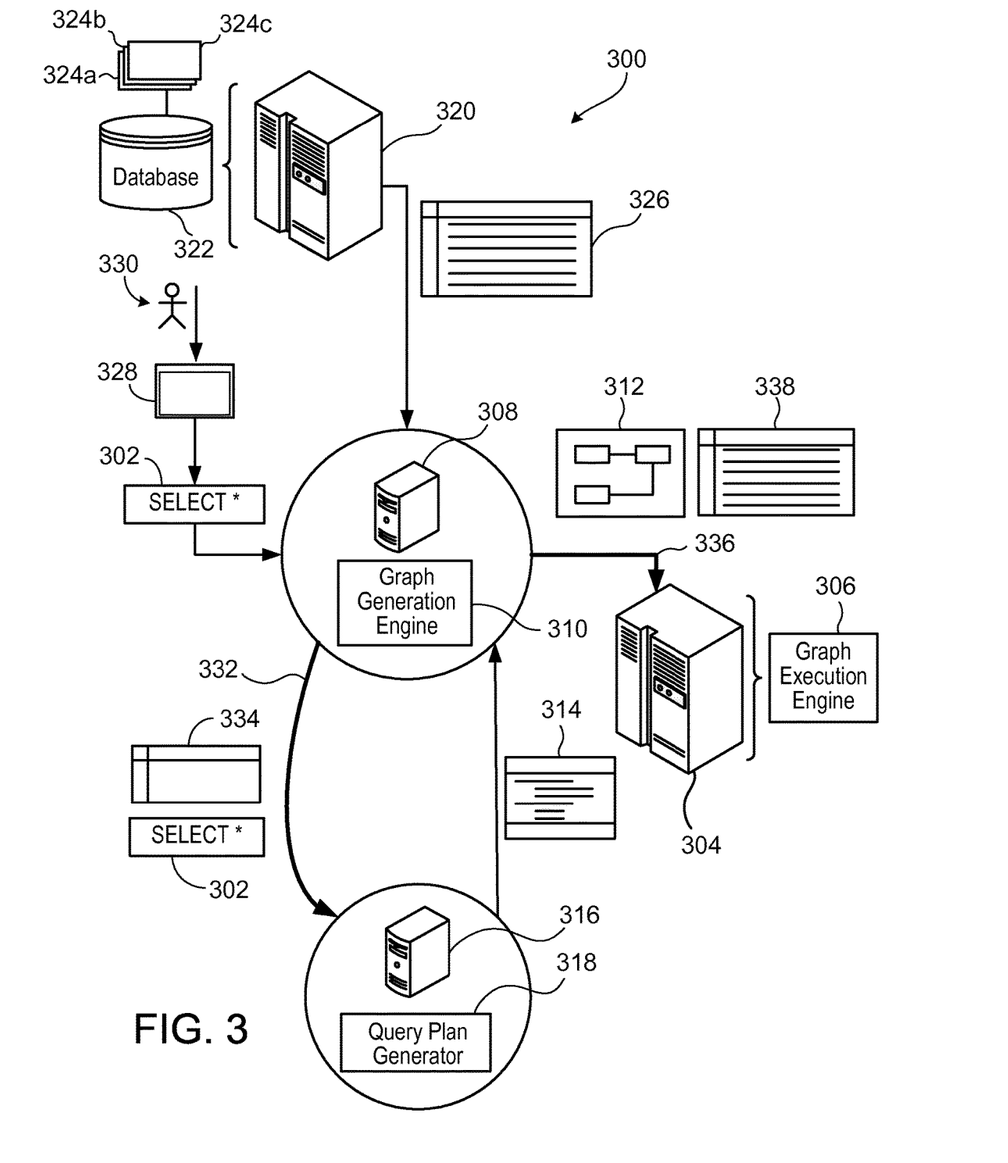
FIG. 3 is an overview of a database system and associated components.

A query plan generator can be used in producing a graph-based database query that emulates another kind of database query such as an SQL query. FIG. 3 shows a database query management system 300 for preparing a database query 302 for execution on a database management computer system 304. The database management computer system 304 shown includes a graph execution engine 306 that handles database operations implemented as dataflow graphs. The database query management system 300 also includes a graph generation computer system 308 having a graph generation engine 310 that can build a dataflow graph 312 from a description of operations to be performed by the dataflow graph. For example, the description of operations could be a query plan 314.

The database query management system 300 also includes a query planning computer system 316 that executes a query plan generator 318. The query plan generator 318 can be any query plan generator that produces a query plan from a database query, and need not be designed with any functionality related to dataflow graphs or graph generation. Further, the database query management system 300 also includes a database computer system 320 having a database 322 in a data storage (e.g. a hard drive, optical disc, etc.) and containing one or more database tables 324a, 324b, 324c.

Although separate computer systems are shown for the database management computer system 304, the graph generation computer system 308, the query planning computer system 316, and the database computer system 320, two or more of these computer systems could be the same computer system, or components of the same computer system. All of the computer systems have at least one processor for executing their respective executable components and at least one data storage system. The computer systems can be connected to each other using a computer network such as a local area network (LAN), a wide-area network (WAN), a network such as the Internet, or another kind of computer network.

To demonstrate the production of a dataflow graph 312 from one or more database queries 302, a database query and a database table 326 are received and processed by the graph generation computer system 308 prior to an execution of the dataflow graph. The graph generation computer system 308 receives the database table 326 from the database computer system 320.

The database table 326 can take any of several forms. For example, the database table 326 could be a relational database table, a partial database table, a flat file, or another kind of data file or collection of data files. In some examples, the database table 326 could be received in the form of information about the database table, e.g. metadata about the database table, or a description of the database table.

In some implementations, the database table 326 could be identified by a data registry associated with the database computer system 320 or otherwise accessible to the graph generation computer system 308. The data registry could be in the form of lookup file catalog, for example, which may contain a data file location associated with the database table 326, and primary key and index information associated with the database table. The data registry could also provide information about the data formats for different types of database tables. Further, the data registry could also provide information about how a dataflow graph 312 can access the database table.

The graph generation computer system 308 also receives a database query 302 to be applied to the database table 326. For example, the database query could be an SQL query. The database query 302 could be received from any number of possible sources. For example, the database query 302 could be received from a user interface 328 where a user 330 has entered the database query. In some examples, the database query 302 is received from a data storage, or the database query is received from a computer network such as the Internet, or the database query is generated based on another previously-received database query.

In some implementations, the graph generation computer system 308 provides (as represented by an arrow 332) a version of the database table 326 to the query planning computer system 316, produced from information about the database table 326. For example, the version of the database table 326 provided to the query planning computer system 316 could be a structural representation 334 of the database table that is smaller in size than the database table and thus requires fewer computational resources to process. The structural representation 334 of the database table 326 may contain information about the database table, but is absent some or all of the data of the database table. For example, the structural representation 334 of the database table 326 could contain a format that reflects the format of the database table, such as the columns, rows, or fields of the database table. The structural representation 334 of the database table 326 could also contain information about the data, such as data storage sizes of elements in the database table, or the data types of elements in the database table.

The graph generation computer system provides (as represented by the arrow 332) the database query 302 and the structural representation 334 of the database table 326 to the query planning computer system 316. The query planning computer system 316 executes the query plan generator 318, which produces a query plan optimized for executing the database query 302 over the database table 326. The structural representation 334 of the database table 326 supplies the same information used by the query plan generator 318 as would be supplied by the database table 326 itself, for example, data sizes, data types, and other information about the data contained in the database table. In some implementations, the structural representation 334 of the database table 326 includes an index of data elements that is used to optimize data lookup and retrieval. The query plan generator 318 can use the index to calculate the speed of identifying and retrieving data elements from the indexed database table 326.

The graph generation computer system 308 receives a query plan 314 from the query planning computer system 316. The query plan 314 describes an arrangement of database operations that can be used to execute the database query 302 over the database table 326. For example, the operations in the query plan 314 can correspond to nodes of a dataflow graph 312. The query plan 314 can also include information about the data types used by the operations in the query plan. For example, the operations in the query plan could have parameters, and the data types of the parameters could be described in the query plan.

Once produced, the query plan 314 is provided to the graph generation computer system 308 for dataflow graph 312 production by the graph generation engine 310. The graph generation engine 310 outputs a dataflow graph 312 corresponding to the query plan 314. In some implementations, the dataflow graph 312 has nodes representing operations described in the query plan, and node links representing flows of data between the operations. Because a dataflow graph 312 may be generated for each instance of preparing a database query for execution, the graph generation engine 310 can generate a dataflow graph quickly enough to respond to real-time requests to execute a database query. In some implementations, the graph generation engine 310 can generate a dataflow graph from a query plan in less than one second.

The graph generation computer system 308 provides (represented by an arrow 336) the dataflow graph 312 generated by the graph generation engine 316 to the database management computer system 304. In some implementations, the graph generation computer system 308 also prepares the database table 326 for use by the database management computer system and provides the prepared database table 338. For example, graph generation computer system 308 might convert the database table 326 from a format used by the graph generation computer system 308 to a format used by the database management computer system 304.

Figure 4:
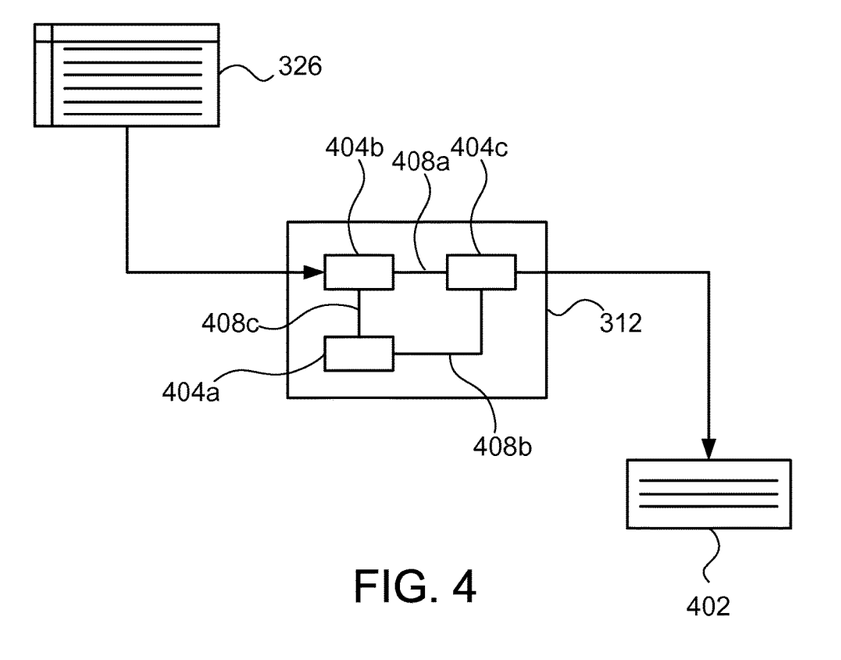
FIG. 4 represents the execution of a dataflow graph.

Once provided to the database management computer system 304, the dataflow graph 312 is prepared for execution. As shown in FIG. 4, the database management computer system 304 can execute operations of the dataflow graph 312 and use the database table 326 in order to produce results 402 of the database query. The database management computer system 304 provides the database table 326 to one or more nodes 404a, 404b, 404c of the dataflow graph 312 and executes the dataflow graph using the graph execution engine 306. The graph execution engine 306 performs the operations represented by the nodes 404a, 404b, 404c of the dataflow graph 312, which correspond to database operations for executing the underlying database query. Further, links 408a, 408b, 408c between the nodes represent flows of data between the database operations as the database table is processed. The dataflow graph 312 outputs the results 402 of the database query.

4 Structural Representation

Figure 5:
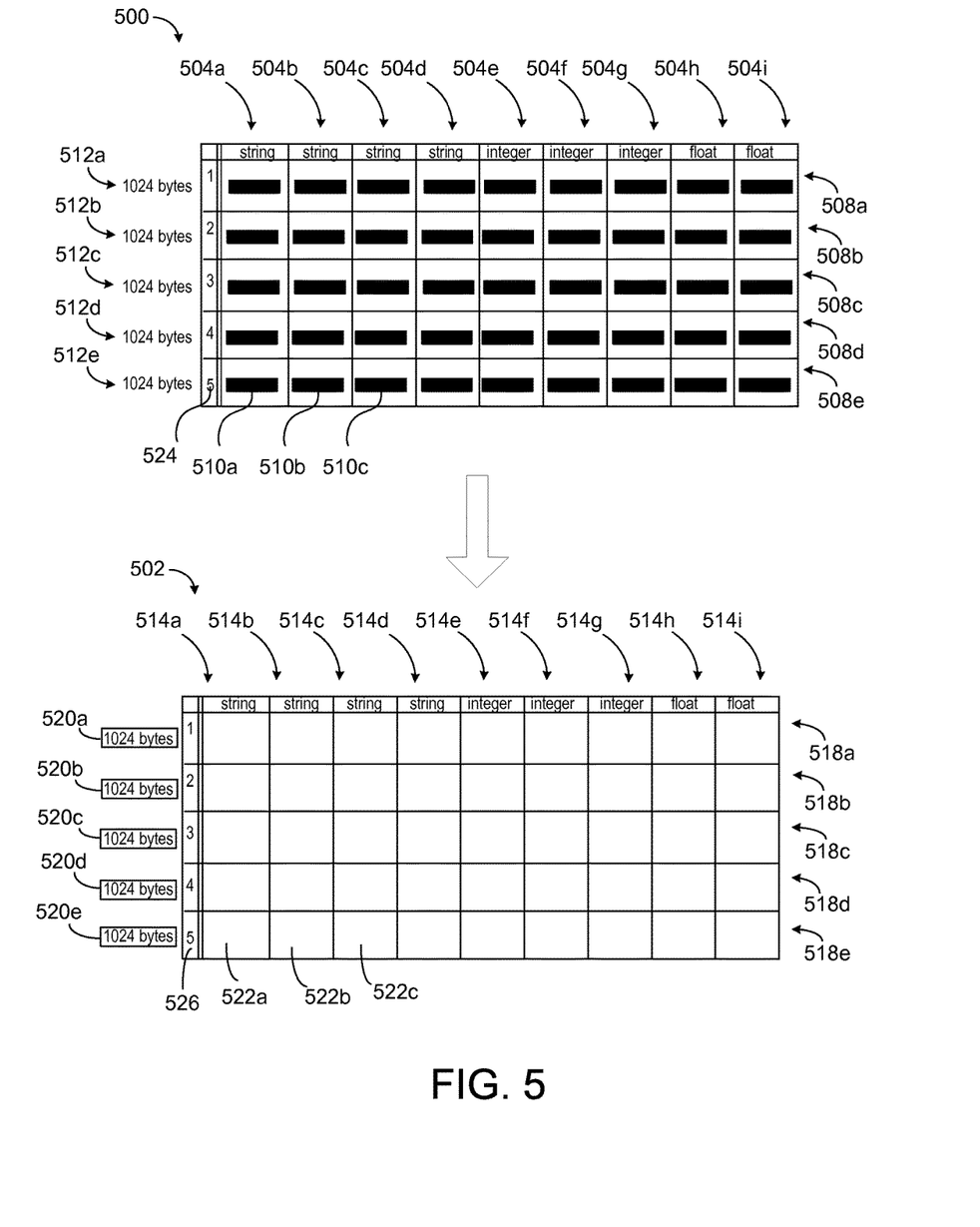
FIG. 5 is a database table and a structural representation of a database table.

FIG. 5 shows an example of a database table 500 and a structural representation 502 of the database table (containing none of the data from the database table). The database table 500 has columns 504a-504i that may contain similar or different types of data. The database table 500 also has rows 508a-508e each containing a field corresponding to each column. Each field of a row contains a data element 510a, 510b, 510c of the data type of the corresponding column (e.g. character string, integer, floating point number, etc.). Further, each row 508a-508e has an inherent data storage size 512a-512e. For example, the data storage size 512a-512e might be the amount of storage space used by the data elements of the row when the row resides in data storage such as memory.

The structural representation 502 of the database table 500 (produced by the graph generation computer system 308 as shown in FIG. 3) has columns 514a-514i identical to the database table, including the same data types as the original columns 504a-504i. The structural representation 502 of the database table 500 also has rows 518a-518e corresponding to the rows 508a-508e of the database table. However, the rows 518a-518e do not contain the data elements 510a, 510b, 510c from the database table 500. Each row 518a-518e is associated with a data storage size value 520a-520e. While the data storage size 512a-512e of a row in the database table 500 could be calculated from the data storage sizes of the individual data elements 510a, 510b, 510c, the data storage size value 520a-520e of each row 518a-518e can itself be a data element stored alongside each row in the structural representation 502 of the database table. The total data storage size of the structural representation 502 of the database table 500 may be a small percentage of the total data storage size of the database table, because the fields 522a, 522b, 522c of the structural representation of the database table are absent the data elements 510a, 510b, 510c from the fields of the database table. In some implementations, the structural representation 502 of the database table 500 may retain some data elements from the database table, for example, the structural representation of the database table may retain data elements corresponding to key values 524, 526 or other data elements used in the structure, organization, or format of the database table. In some implementations, the structural representation 502 of the database table 500 may contain an index or another data structure that provides information used in data retrieval. In some implementations, the structural representation 502 of the database table 500 may contain other statistics about the data contained in the database table.

5 Function Calls

Figure 6:
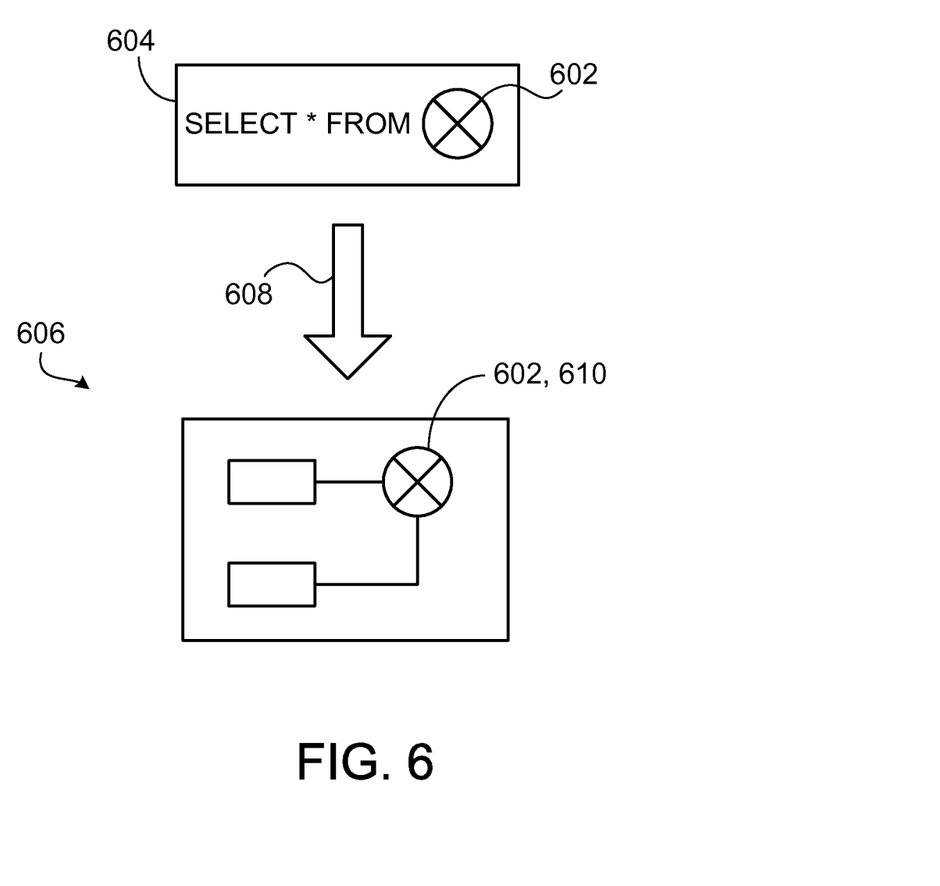
FIG. 6 illustrates a database query and a dataflow graph each containing an executable function.

As shown in FIG. 6, in some implementations, a custom graph function 602 can be embedded in a database query 604. For example, the custom graph function 602 might represent an operation that a dataflow graph 606 can carry out during the execution of the dataflow graph. The custom graph function 602 might not have any functionality within the context of the database query 604, and is placed in the database query to be passed to the generated dataflow graph 606. For example, the custom graph function 602 might be added to a database query 604 to prepare it for conversion to a dataflow graph but replacing or augmenting part of the existing database query. Further, the query plan generator might not have information about the functionality of the custom graph function 602. The custom graph function 602 may be a function that has no equivalent function in the language of the database query 604. In some implementations, the query plan generator may be aware of the input data type or output data type for the custom graph function 602. When the dataflow graph 606 is generated 608, the custom graph function 602 could act as a node 610 of the dataflow graph.

In some implementations, the custom graph function 602 may be a function used for accessing data in a special or customized format, or the custom graph function may be a function used to execute a regular expression or pattern matching expression, or the custom graph function may be a function implemented by a user, for example, a user of the database management computer system.

6 Flow of Operation

Figure 7:
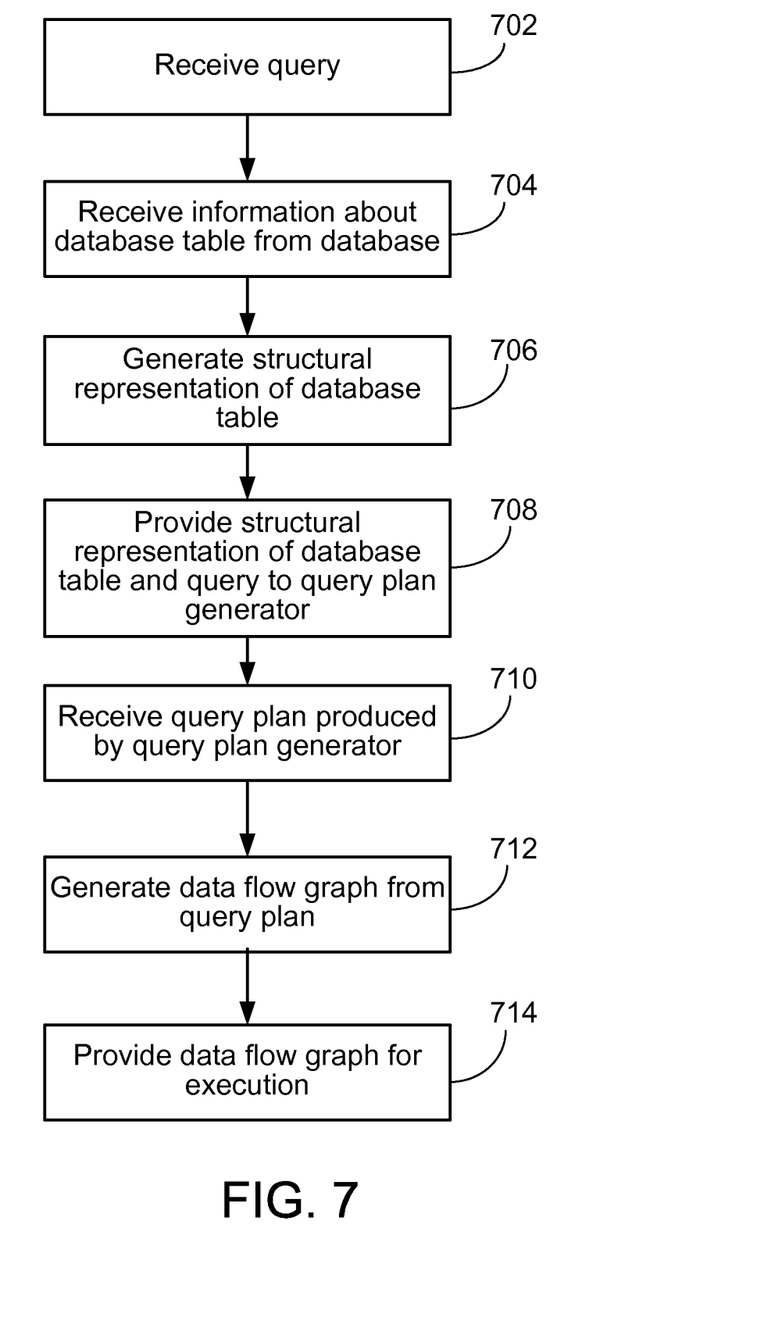
FIGS. 7-8 are flowcharts for operations of a database system.

FIG. 7 is a flowchart 700 showing exemplary operations of the graph generation computer system 308 (shown in FIG. 3). In step 702, the graph generation computer system receives a database query, for example, from a user interface or from data storage. In step 704, the graph generation computer system receives information a database table from a database on a database system, e.g., the graph generation computer system may receive the database table itself from a data storage, or the graph generation computer system may receive metadata about the database table, or the graph generation computer system may receive information about the database table as entered by a user at a user interface. In step 706, the graph generation computer system generates a structural representation of the database table that includes a formatted data organization reflective of the database table and is absent the data of the database table. In step 708, the graph generation computer system provides the structural representation of the database table and the database query to a query planning computer system for use by a query plan generator. In step 710, the graph generation computer system receives a query plan, produced by the query plan generator, from the query planning computer system. In step 712, the graph generation computer system uses a graph generation engine to generate a dataflow graph from the query plan based on the operations described in the query plan. In step 714, the graph generation computer system provides the dataflow graph for execution (e.g by a graph execution engine of a database management system).

Figure 8:
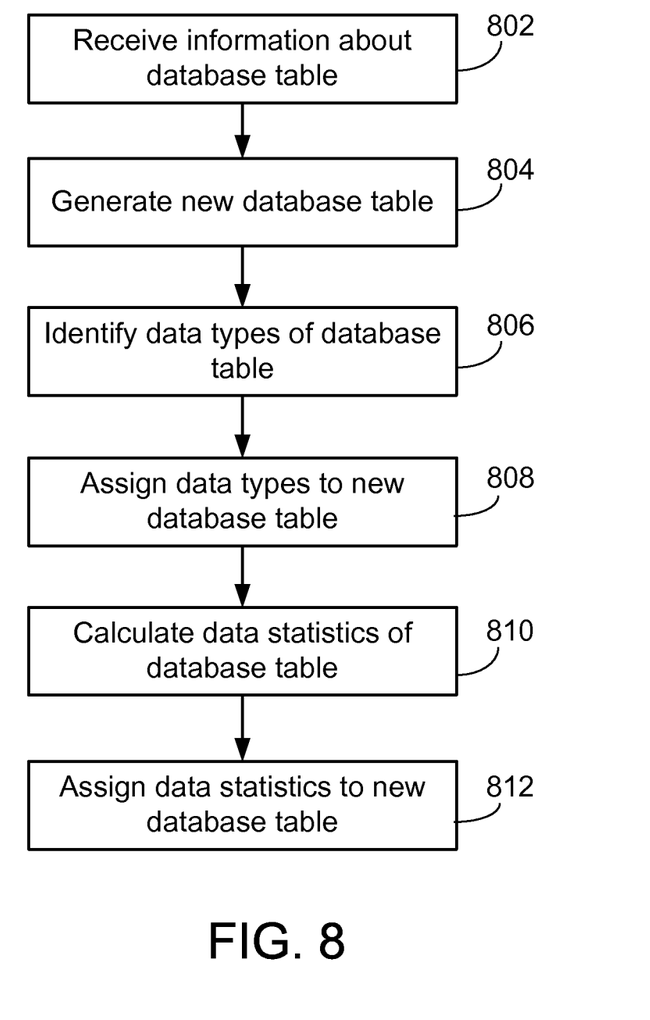

FIG. 8 is a flowchart 800 showing exemplary operations of the graph generation computer system 308 (shown in FIG. 3). In step 802, the graph generation computer system receives information about a database table, for example, the graph generation computer system may receive a database table previously received from a user interface or from data storage, or may receive metadata describing the database table. In step 804, the graph generation computer system generates a new database table having the same column and row format of the received database table. In step 806, the graph generation computer system identifies the data types associated with the received database table by extracting the data types from the columns of the database table. In step 808, the graph generation computer system assigns the identified data types to the columns of the new database table. In step 810, the graph generation computer system calculates data statistics about the received database table, for example, the data storage sizes of the data elements of the rows of the received database table. In step 812, the graph generation computer system assigns the calculated data statistics to the new database table, which serves as the structural representation of the received database table.

The database query managing approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method of operating on data from a data source, the data stored in a tangible, non-transitory computer-readable medium of the data source, the operating based on a query that is expressed in accordance with a query language applicable to a relational database, the operating including:

receiving a query;

identifying a data source based on the query;

identifying a requesting system other than a system managing a relational database storing data of the data source;
generating, by the requesting system, a request to a query planner based on the query;
providing, by the requesting system, the request to the query planner;
receiving a query plan generated by the query planner based on the request, the query plan including a description of one or more steps to be performed by a system managing a relational database;
generating a data structure instantiating a dataflow graph that includes:
 a first node that represents at least one operation to be executed,
 the first node associated with information usable by an executing system to invoke executable program code to perform the at least one operation,
 the first node associated with information usable by an executing system to make data available to the program code, and
 the at least one operation chosen based on a step described by the query plan, and
 at least one link that represents output data of an operation of the first node being provided as input data to an operation of a second node of the dataflow graph;
receiving data from the data source;
identifying an executing system other than a system managing a relational database storing data of the data source; and
executing, on the identified executing system, program code based on the dataflow graph.

2. The method of claim 1, wherein the dataflow graph includes a third node that represents an operation to be executed other than an operation chosen based on any step described by the query plan.

3. The method of claim 1, wherein executing the program code based on the dataflow graph includes instantiating a link between a node of the dataflow graph and a node of a second dataflow graph, the second dataflow graph including at least one node that represents an operation to be executed other than an operation chosen based on any step described by the query plan.

4. The method of claim 1, wherein the data source includes a relational database table.

5. The method of claim 1, wherein the data source includes a portion of data other than a relational database table.

6. The method of claim 1, wherein the data source includes a flat file.

7. The method of claim 1, wherein the query includes an SQL query.

8. The method of claim 1, including receiving, from the program code based on the dataflow graph, results of the query.

9. The method of claim 1, wherein the query plan generator includes a query optimizer.

10. The method of claim 1, wherein the query plan includes data types of parameters in the query.

11. The method of claim 1, wherein the query contains a reference to an executable function, and the dataflow graph includes a node representing the executable function.

12. The method of claim 1, wherein generating a request to a query planner based on the query includes
 producing a structural representation of the data source wherein the structural representation includes a formatted data organization reflective of the data source and is absent data of the data source; and
 including the structural representation in the request to the query planner.

13. The method of claim 1, wherein the data structure is generated by the identified executing system.

14. The method of claim 1, wherein the data structure is generated by a system other than the identified executing system.

15. The method of claim 1, wherein the executing system and the requesting system are the same system.

16. The method of claim 1, wherein the executing system and the requesting system are different systems.

17. A system for operating on data from a data source, the data stored in a tangible, non-transitory computer-readable medium of the data source, the operating based on a query that is expressed in accordance with a query language applicable to a relational database, the system including:
 a computer system configured for:
  receiving a query;
  identifying a data source based on the query;
  identifying a requesting system other than a system managing a relational database storing data of the data source;
  generating, by the requesting system, a request to a query planner based on the query;
  providing, by the requesting system, the request to the query planner;
  receiving a query plan generated by the query planner based on the request, the query plan including a description of one or more steps to be performed by a system managing a relational database;
  generating a data structure instantiating a dataflow graph that includes:
   a first node that represents at least one operation to be executed,
   the first node associated with information usable by an executing system to invoke executable program code to perform the at least one operation,
   the first node associated with information usable by an executing system to make data available to the program code, and
   the at least one operation chosen based on a step described by the query plan, and
   at least one link that represents output data of an operation of the first node being provided as input data to an operation of a second node of the dataflow graph;
  receiving data from the data source;
  identifying an executing system other than a system managing a relational database storing data of the data source; and
  providing the program code based on the dataflow graph to the identified executing system;
 a requesting system other than a system managing a relational database storing data of the data source, the requesting system configured to generate and provide the request to the query planner; and
 an executing system other than a system managing a relational database storing data of the data source, the executing system configured to receive the program code and execute the program code.

18. The system of claim 17, wherein the data source includes a relational database table.

19. The system of claim 17, wherein the data source includes a portion of data other than a relational database table.

20. The system of claim 17, wherein the data source includes a flat file.

21. The system of claim 17, wherein the data structure is generated by the identified executing system.

22. The system of claim 17, wherein the data structure is generated by a system other than the identified executing system.

23. The system of claim 17, wherein the executing system and the requesting system are the same system.

24. The system of claim 17, wherein the executing system and the requesting system are different systems.

25. A computer-readable storage device storing a computer program including instructions for causing a computer to operate on data from a data source, the data stored in a tangible, non-transitory computer-readable medium of the data source, the operating based on a query that is expressed in accordance with a query language applicable to a relational database, the operating including:
receiving a query;
identifying a data source based on the query;
identifying a requesting system other than a system managing a relational database storing data of the data source;
generating, by the requesting system, a request to a query planner based on the query;
providing, by the requesting system, the request to the query planner;
receiving a query plan generated by the query planner based on the request, the query plan including a description of one or more steps to be performed by a system managing a relational database;
generating a data structure instantiating a dataflow graph that includes:
a first node that represents at least one operation to be executed,
the first node associated with information usable by an executing system to invoke executable program code to perform the at least one operation,
the first node associated with information usable by an executing system to make data available to the program code, and
the at least one operation chosen based on a step described by the query plan, and
at least one link that represents output data of an operation of the first node being provided as input data to an operation of a second node of the dataflow graph;
receiving data from the data source;
identifying an executing system other than a system managing a relational database storing data of the data source; and
providing the program code based on the dataflow graph to the identified executing system.

26. The computer-readable storage device of claim 25, wherein the data source includes a relational database table.

27. The computer-readable storage device of claim 25, wherein the data source includes a portion of data other than a relational database table.

28. The computer-readable storage device of claim 25, wherein the data source includes a flat file.

29. The computer-readable storage device of claim 25, wherein the data structure is generated by the identified executing system.

30. The computer-readable storage device of claim 25, wherein the data structure is generated by a system other than the identified executing system.

31. The computer-readable storage device of claim 25, wherein the executing system and the requesting system are the same system.

32. The computer-readable storage device of claim 25, wherein the executing system and the requesting system are different systems.

33. A system for operating on data from a data source, the data stored in a tangible, non-transitory computer-readable medium of the data source, the operating based on a query that is expressed in accordance with a query language applicable to a relational database, the system including:
means for:
receiving a query;
identifying a data source based on the query;
identifying a requesting system other than a system managing a relational database storing data of the data source;
generating, by the requesting system, a request to a query planner based on the query;
providing, by the requesting system, the request to the query planner;
receiving a query plan generated by the query planner based on the request, the query plan including a description of one or more steps to be performed by a system managing a relational database;
generating a data structure instantiating a dataflow graph that includes:
a first node that represents at least one operation to be executed,
the first node associated with information usable by an executing system to invoke executable program code to perform the at least one operation,
the first node associated with information usable by an executing system to make data available to the program code, and
the at least one operation chosen based on a step described by the query plan, and
at least one link that represents output data of an operation of the first node being provided as input data to an operation of a second node of the dataflow graph;
receiving data from the data source;
identifying an executing system other than a system managing a relational database storing data of the data source and
providing the program code based on the dataflow graph to the identified executing system; and
means for receiving the program code and executing the program code.

34. A method of operating on data from a data source, the data stored in a tangible, non-transitory computer-readable medium of the data source, the operating based on a query that is expressed in accordance with a query language applicable to a relational database, the operating including:
receiving a query;
identifying a data source based on the query;
identifying an executing system other than a system managing a relational database storing data of the data source;
generating a structural representation of data of the data source, the structural representation including a formatted data organization reflective of the data source and absent at least some of the data of the data source;
generating a request to a query planner based on the query, the request instructing the query planner to generate a query plan based on the query and providing the structural representation as data to be acted upon by the query;

providing the request to the query planner;

receiving a query plan generated by the query planner based on the request, the query plan including a description of one or more steps to be performed by a system managing a relational database;

generating a data structure instantiating a dataflow graph that includes:
- a first node that represents at least one operation to be executed,
- the first node associated with information usable by an executing system to invoke executable program code to perform the at least one operation,
- the first node associated with information usable by an executing system to make data available to the program code, and
- the at least one operation chosen based on a step described by the query plan, and
- at least one link that represents output data of an operation of the first node being provided as input data to an operation of a second node of the dataflow graph;

receiving data from the data source; and executing, on the identified executing system, program code based on the dataflow graph.

35. The method of claim 34, wherein the data source includes a relational database table.

36. The method of claim 34, wherein the data source includes a portion of data other than a relational database table.

37. The method of claim 34, wherein the data source includes a flat file.

38. The method of claim 34, wherein the data structure is generated by the identified executing system.

39. The method of claim 34, wherein the data structure is generated by a system other than the identified executing system.

40. The method of claim 34, wherein the executing system and the requesting system are the same system.

41. The method of claim 34, wherein the executing system and the requesting system are different systems.

* * * * *